United States Patent
Lee et al.

(10) Patent No.: US 9,535,459 B2
(45) Date of Patent: Jan. 3, 2017

(54) SNAP-ON BATTERY AND PORTABLE ELECTRONIC DEVICE HAVING THE SAME

(71) Applicant: GETAC TECHNOLOGY CORPORATION, Hsinchu County (TW)

(72) Inventors: Kun-Cheng Lee, Taipei (TW); Juei-Chi Chang, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 333 days.

(21) Appl. No.: 14/147,471

(22) Filed: Jan. 3, 2014

(65) Prior Publication Data
US 2014/0370739 A1    Dec. 18, 2014

Related U.S. Application Data

(60) Provisional application No. 61/834,561, filed on Jun. 13, 2013.

(51) Int. Cl.
*H01M 6/12* (2006.01)
*G06F 1/16* (2006.01)
*H01M 2/10* (2006.01)

(52) U.S. Cl.
CPC .......... *G06F 1/1635* (2013.01); *H01M 2/1066* (2013.01)

(58) Field of Classification Search
CPC ............................ H01M 2/1066; G06F 1/1635
USPC .......................................................... 429/163
See application file for complete search history.

(56) References Cited

U.S. PATENT DOCUMENTS

2012/0162881 A1\* 6/2012 Usui .................... H04M 1/0262
                                                              361/679.01
2012/0314355 A1\* 12/2012 Miyamatsu ......... H01M 2/1066
                                                              361/679.01

\* cited by examiner

*Primary Examiner* — Gary Harris

(57) ABSTRACT

A snap-on battery includes a battery body and a fastening element, and the battery body has a guiding element disposed on a side of the battery body, and the fastening element is slidably coupled to and positioned at the guiding element, and the fastening element has a combining portion for combining an external connecting element. With the aforementioned components, the battery can be detachably snapped on a portable electronic device, and even if a user forgets to close a door with cover or secure the door with cover, the battery will be still hard to slip off the portable electronic device or damages due to falling out.

8 Claims, 9 Drawing Sheets

SNAP-ON BATTERY AND PORTABLE ELECTRONIC DEVICE HAVING THE SAME

FIELD OF THE INVENTION

The present invention relates to a battery, and more particularly to a snap-on battery and a portable electronic device having the battery.

BACKGROUND OF THE INVENTION

As to portable electronic devices (such as military and industrial notebook computers), battery is generally used for supplying electric power, so that the notebook computers can be used during a trip or when the utility power is not available.

In the portable electronic device, a compartment is generally formed on a side of a casing of the portable electronic device, and the compartment has an opening. A door with cover is mounted onto the opening to seal the opening. The conventional battery generally does not come with any fixing structure, so it is necessary to seal the opening by the door with cover when the battery is installed into the compartment, and thus fix the battery into the compartment.

However, if a user forgets to close the door with cover or secure the door with cover, the battery may fall out from the portable electronic device, thus resulting in damages to the battery.

To facilitate users to draw the battery out from the compartment, a conventional method is to add a pull tape to the body of the battery. However, the pull tape may be broken easily and cannot be replaced conveniently. After the pull tape is broken, the users have difficulties to remove the battery from the compartment.

SUMMARY OF THE INVENTION

Therefore, the present invention is to provide a snap-on battery and a portable electronic device having the battery, wherein the battery can be detachably snapped onto the portable electronic device, so that even if a user forgets to close or secure the door with cover, the battery may not fall out easily or be damaged.

Accordingly, the present invention provides a snap-on battery comprising: a battery body, a guiding element disposed on a side of the battery body, and a fastening element slidably coupled and fixed to the guiding element, wherein the fastening element has a combining portion for combining an external connecting element.

The present invention further provides a portable electronic device having the snap-on battery, comprising: a casing, having an opening portion, a rib formed in the opening portion, and a rugged structure disposed at the rib; and a battery, passed through the opening portion and contained in the casing, and including a battery body, a fastening element, and a guiding element slidably coupled to the fastening element and fixed to the guiding element, wherein the fastening element has a corresponding rugged structure corresponding to the rugged structure and the corresponding rugged structure of the fastening element is entered from an outer side of the rugged structure into an inner side of the rugged structure, and snapped through sliding.

Compared with the prior art, the present invention has the following advantages and effects: With the guiding element and the fastening element, the battery can be detachably snapped onto the casing of the portable electronic device, so that even if a user forgets to close or secure the door with cover, the battery can still be snapped onto the casing, so as to prevent the battery from falling out or being damaged easily.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

Figure 1:
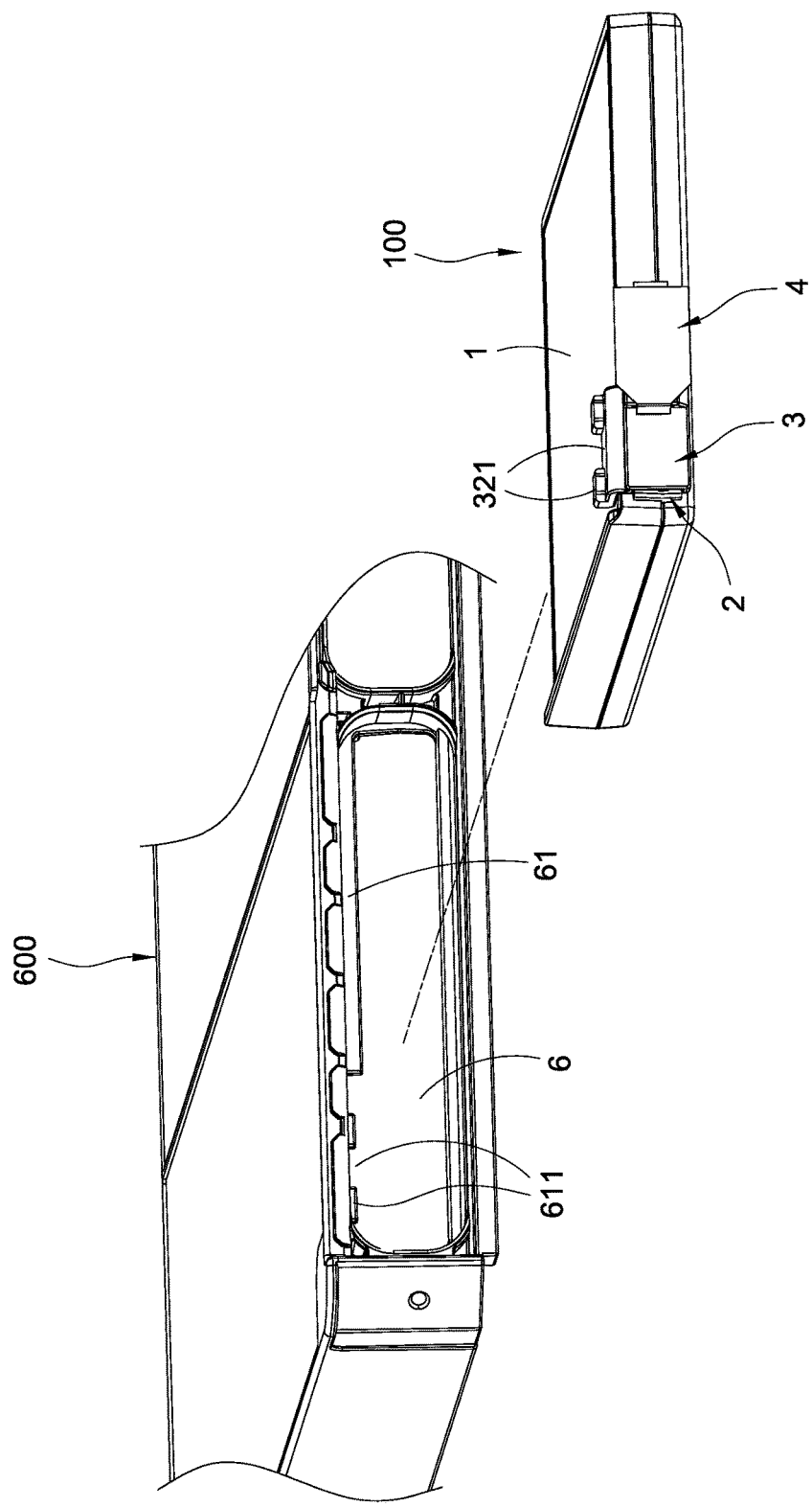
FIG. 1 is a partial exploded view of a portable electronic device according to the present invention.
Figure 2:
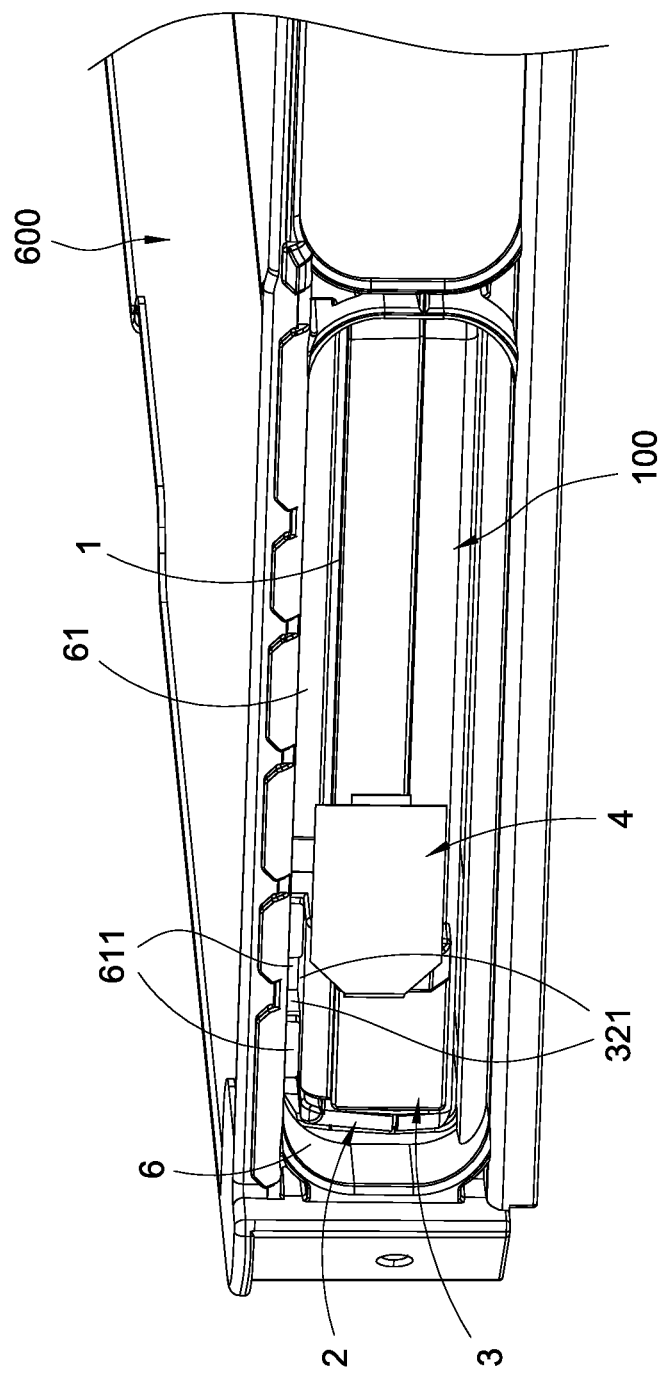
FIG. 2 is a perspective view of FIG. 1.

With reference to FIGS. 1 and 2 for a snap-on battery and a portable electronic device having the battery in accordance with the present invention, the portable electronic device comprises a casing 600 having an opening portion 6 formed thereon. The opening portion 6 has a rib 61 formed on an inner side of the opening portion 6. The rib 61 has a rugged structure 611. In the figures, the rugged structure 611 includes at least two bumps (not labeled in the figures) with a gap apart from one another and at least two notches (not labeled in the figures). The battery 100 is passed through the opening portion 6 and contained in the casing 600.

Figure 3:
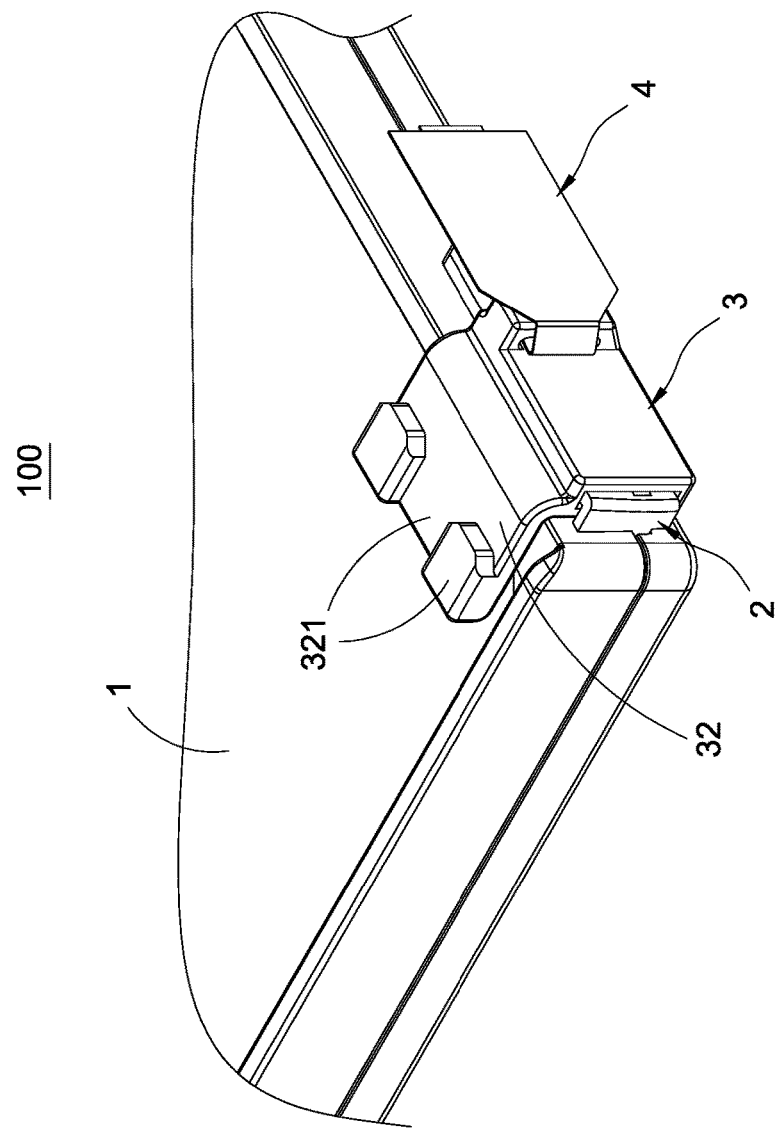
FIG. 3 is a partial exploded view of a snap-on battery according to the present invention.
Figure 4:
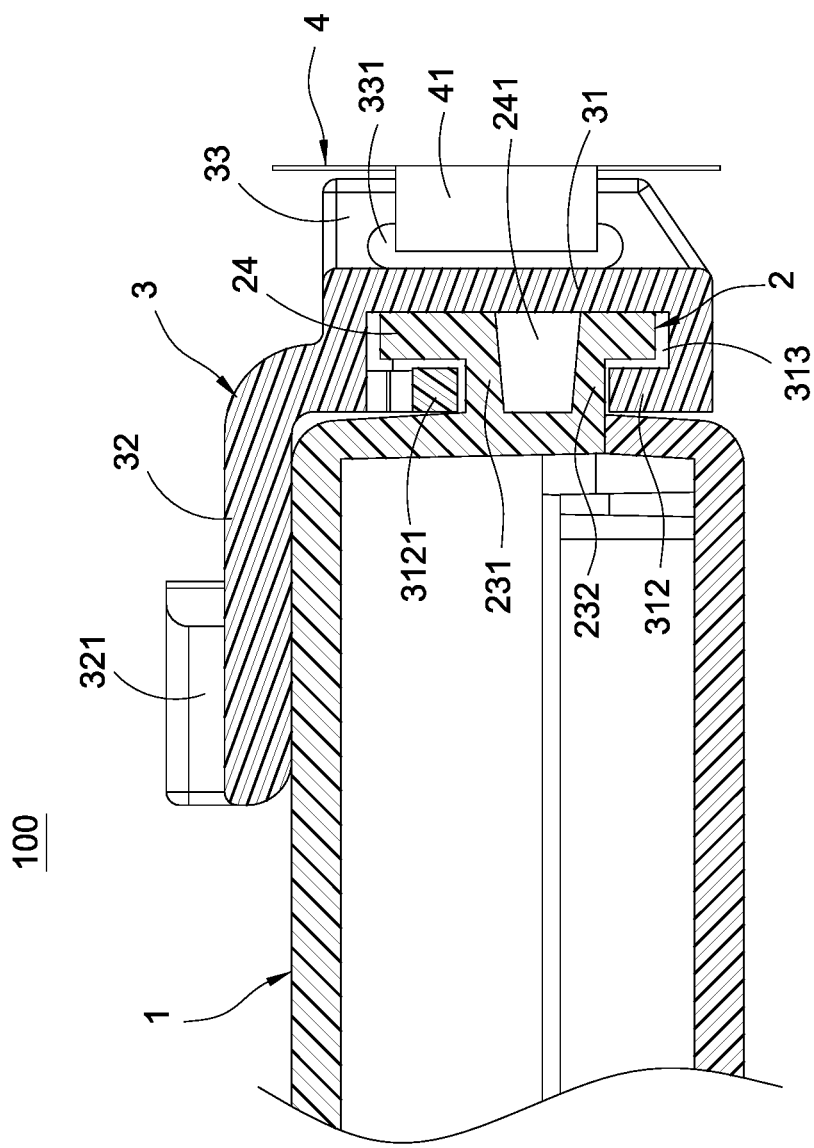
FIG. 4 is a sectional view of FIG. 3.

With reference to FIGS. 3 and 4 for a partial perspective view and a sectional view of a snap-on battery of the present invention respectively, the battery 100 comprises a battery body 1 and a fastening element 3. The battery body 1 includes a guiding element 2 installed on a side of the battery body 1. The fastening element 3 has a corresponding rugged structure 321 corresponding to the rugged structure 611. The fastening element 3 is slidably coupled to and positioned at the guiding element 2.

Figure 5:
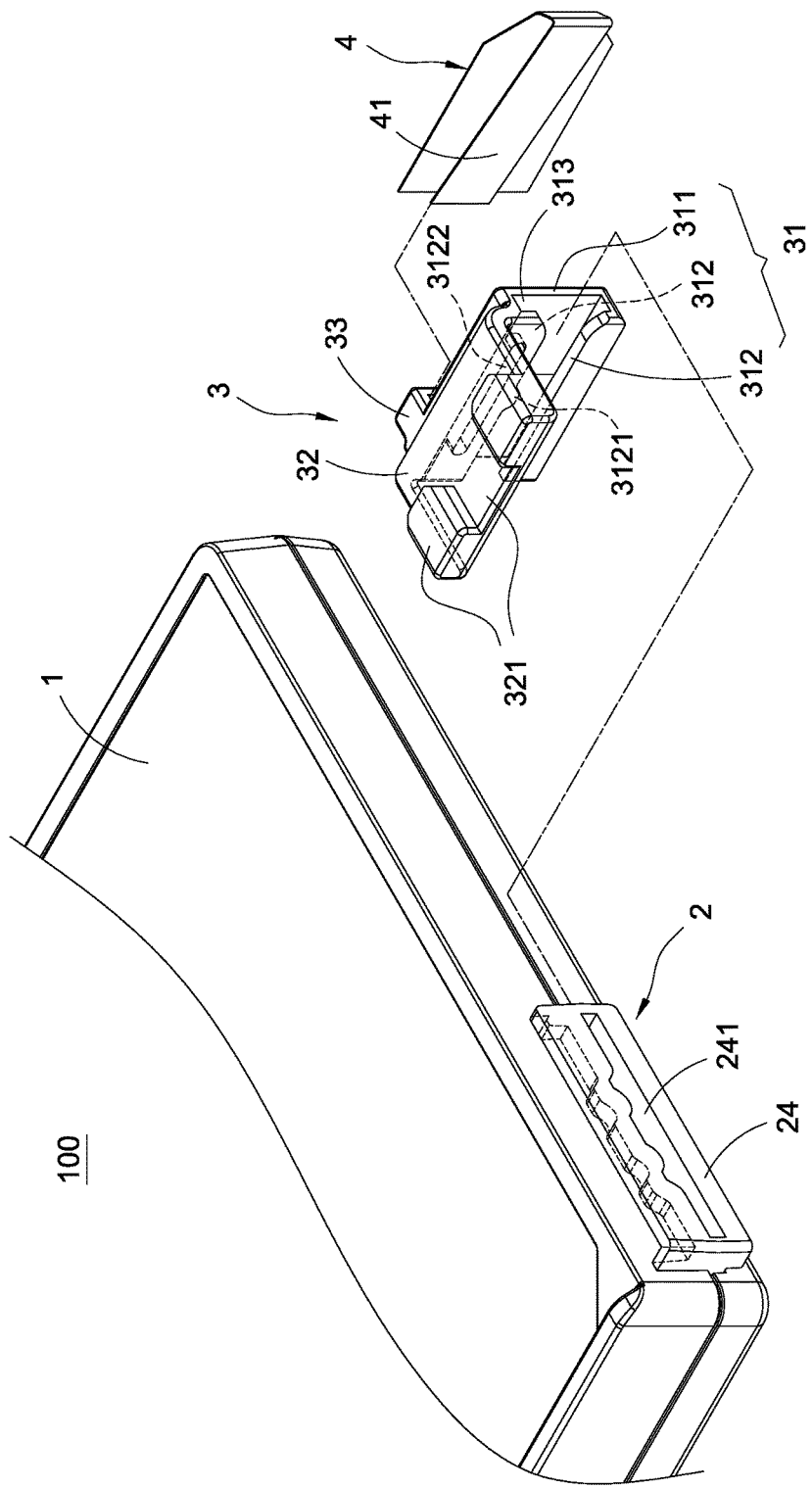
FIG. 5 is a partial exploded view of a snap-on battery according to the present invention.
Figure 6:
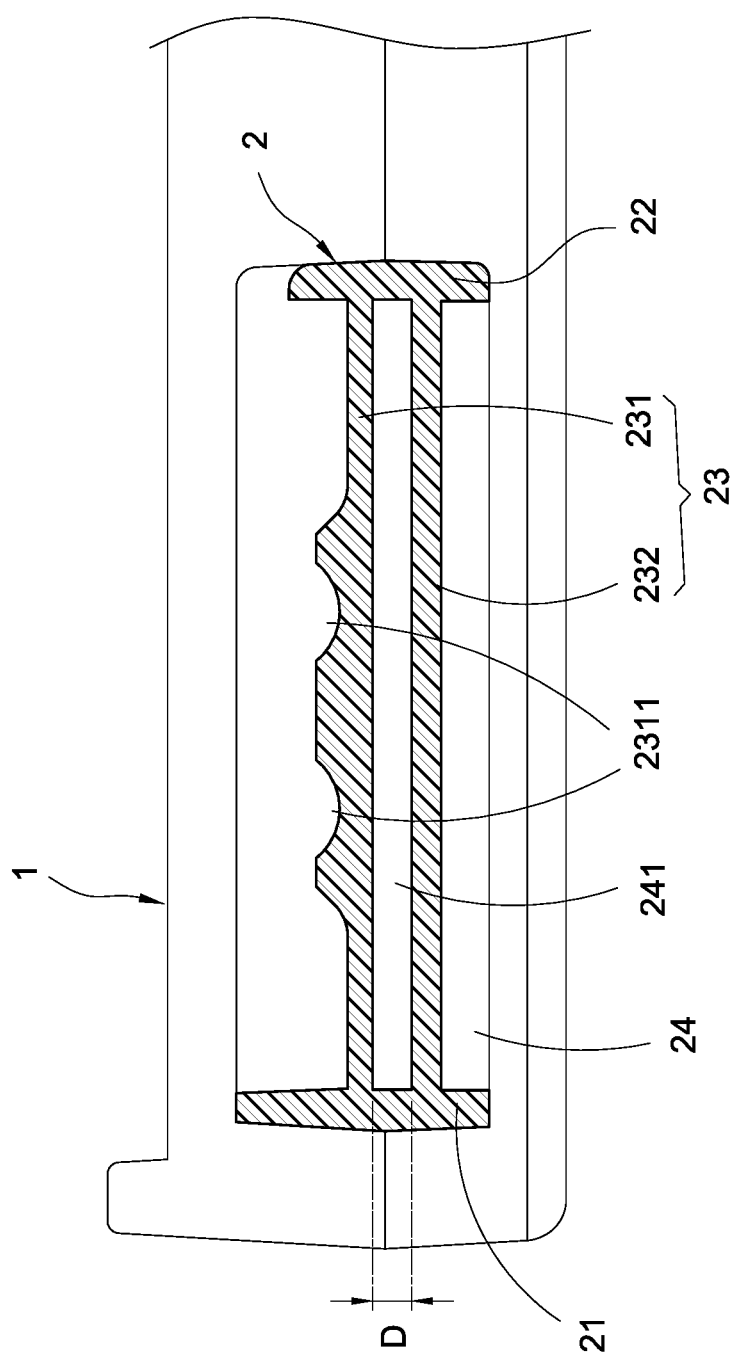
FIG. 6 is a sectional view of a guiding element of FIG. 5.

With reference to FIGS. 5 and 6 for a perspective view of a battery 100 and a sectional view of a guiding element 2 (without showing the side view of a base 24) in accordance with the present invention, the guiding element 2 comprises a first blocking body 21, a second blocking body 22, and a guiding rail 23 coupled between the first blocking body 21 and the second blocking body 22. The guiding element 2 is coupled to a side of the battery body 1 through the first blocking body 21.

In FIG. 6, the guiding rail 23 includes a first rail 231 and a second rail 232, wherein a gap D is formed transversally between the first rail 231 and a second rail 232. The first rail 231 further has two arc-shaped positioning portions 2311. In addition, the guiding element 2 further includes a base 24. The first blocking body 21, the second blocking body 22, the first rail 231 and the second rail 232 are formed on the inner side of the base 24 a long hole 241 is defined together by the first blocking body 21, the second blocking body 22, the first rail 231 and the second rail 232 such that the long hole 241 corresponds to the base 24, thereby the first rail 231 and the second rail 232 have an appropriate elasticity. Further, both ends of the second blocking body 22 come with a design of round corners.

In FIG. 5, the fastening element 3 includes a sliding sleeve 31 slidably coupled to the guiding rail 23 and an extending body 32 extended from the sliding sleeve 31 and having a corresponding rugged structure 321. The sliding sleeve 31 includes a main body 311 and two flanges 312 bent from the main body 311 in opposite sides from each other. A chute 313 is formed between the main body 311 and the two flanges 312. The fastening element 3 is slidably coupled to the guiding rail 23 on the guiding element 2 through the chute 313, so that the fastening element 3 can be slid and moved reciprocally on the guiding rail 23, and the sliding sleeve 31 of the fastening element 3 is blocked by the first blocking body 21 and the second blocking body 22, so that the sliding sleeve 31 will not fall out from the guiding rail 23. The two flanges 312 of the fastening element 3 abut the upper edge of the first rail 231 and the lower edge of the second rail 232 respectively. One of the two flanges 312 has a snap-on body 3121 (see FIG. 5). The snap-on body 3121 can be movably snapped onto and positioned at any one of the positioning portions 2311 of the first rail 231.

In this preferred embodiment, the corresponding rugged structure 321 of the fastening element 3 as shown in FIG. 5 further comprises at least two bumps (not labeled in the figure) and at least one notch (not labeled in the figure) disposed between the two bumps. One of the two flanges 312 having the snap-on body 3121 further includes a long hole 3122 formed thereon (as shown in FIG. 5), so that the flange 312 of the snap-on body 3121 can have an appropriate elasticity. An end of the two flanges 312 comes with a round-corner design, and round corners of the two flanges 312 are corresponsive to the round corners of the second blocking body 22, so that the sliding sleeve 31 can be slidably coupled to the guiding rail 23 from an end of the guiding element 2 but will be hard to fall out in the opposite direction.

Figure 7:
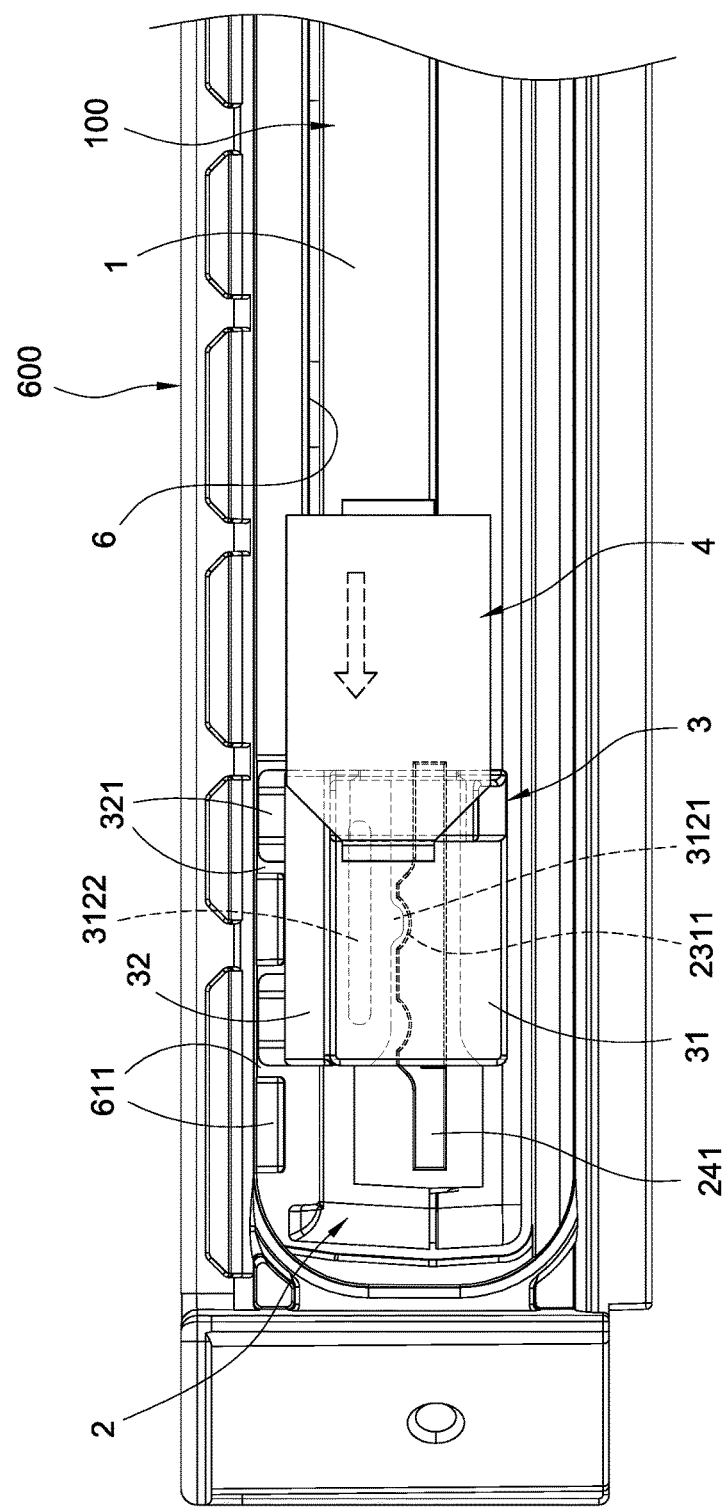
FIG. 7 is a schematic view of the present invention before a battery is snapped onto a portable electronic device.
Figure 8:
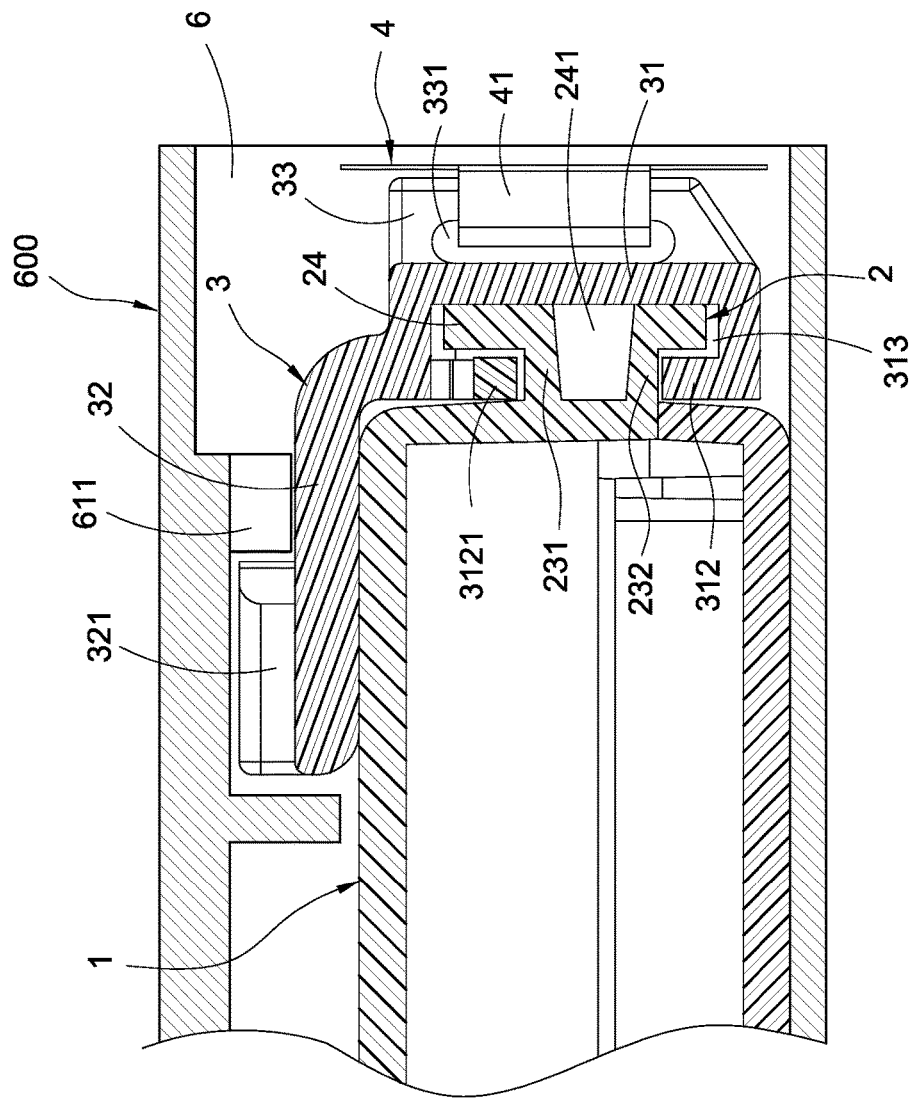
FIG. 8 is a sectional view of FIG. 7.
Figure 9:
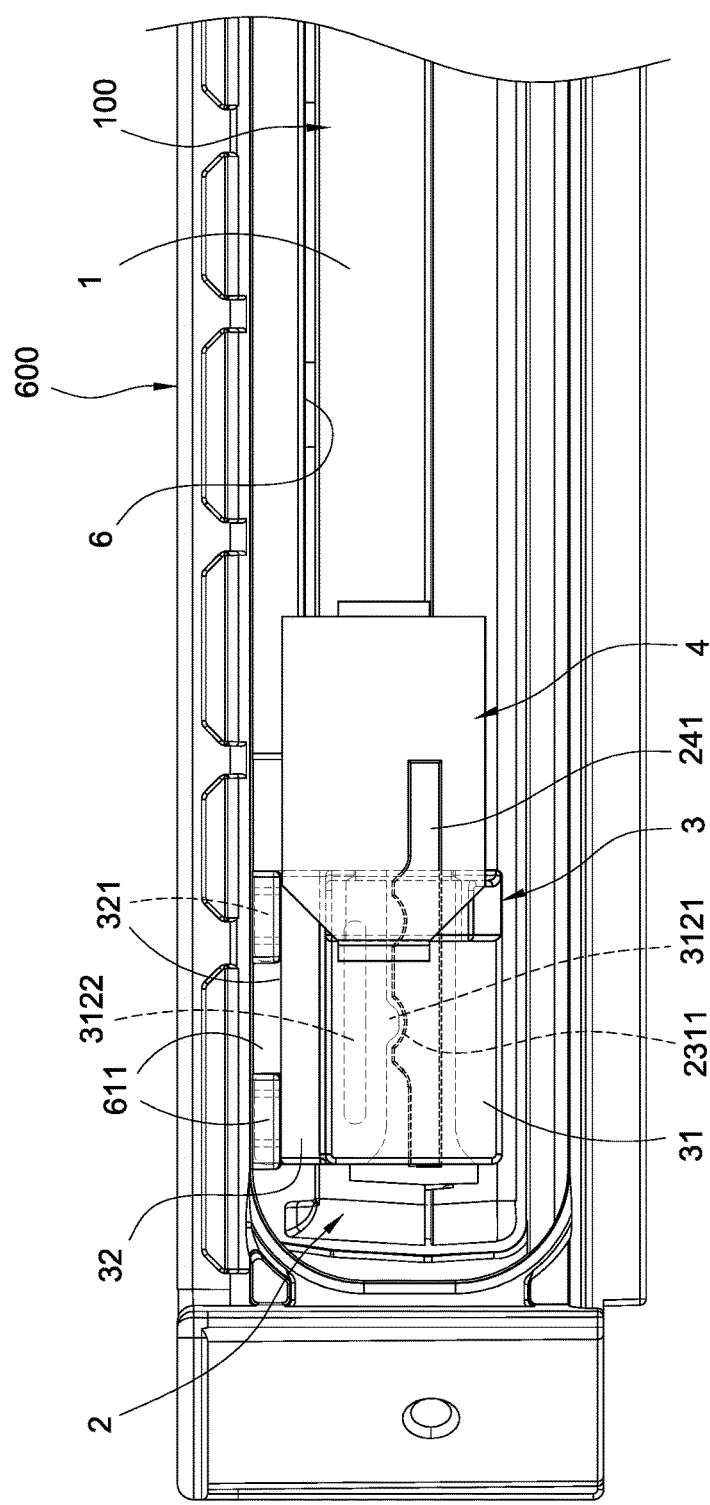
FIG. 9 is a schematic view of the present invention after a battery is snapped onto a portable electronic device.

Please refer to FIGS. 7, 8 and 9. FIG. 7 is a schematic view of the present invention before a battery is snapped onto a portable electronic device. FIG. 8 is a sectional view of FIG. 7. FIG. 9 is a schematic view of the present invention after a battery is snapped onto a portable electronic device. The sliding sleeve 31 of the fastening element 3 is slidably coupled to the guiding rail 23 of the guiding element 2, the snap-on body 3121 of the fastening element 3 is elastically snapped onto one of the two positioning portions 2311. Regarding the way of snapping the battery 100 into the opening portion 6 of the casing 600, which will be described as follows. Firstly, the snap-on body 3121 is elastically snapped into the right positioning portion 2311 in FIG. 7, and then the battery 100 is passed through the opening portion 6 and received in the casing 600 of the portable electronic device. In the meanwhile, the corresponding rugged structure 321 of the fastening element 3 and the rugged structure 611 of the casing 600 are engaged with each other. That is, the bumps are corresponsive to the notches, and the notches are corresponsive to the bumps, but the battery 100 is still situated at unlocked status as shown in FIG. 7. After the battery 100 is placed into the casing 600, the corresponding rugged structure 321 of the fastening element 3 is entered from the outer side of the rugged structure 611 (as shown in FIG. 8) into the inner side of the rugged structure 611, and then the fastening element 3 is slid toward the left side, and the snap-on body 3121 is elastically snapped to the left positioning portion 2311. In the meanwhile, the corresponding rugged structure 321 and the rugged structure 611 are aligned with each other. That is, the bumps are corresponsive to the bumps, and the notches are corresponsive to the notches, so that the corresponding rugged structure 321 is engaged with the inner side of the rugged structure 611, and the battery 100 is situated at a locked status as shown in FIG. 9. Finally, the door with cover (not shown in the figure) is closed.

In contrary, if it is necessary to remove the battery 100, the door with cover is opened first, and then the fastening element 3 is slide toward the left (i.e. it making the battery 100 an unlocked status) such that the battery 100 is pulled out in the opposite direction.

In addition, the battery body 1 of the battery 100 of the present invention has an external connecting element 4, and the battery 100 can be pulled out from the casing 600 by pulling the external connecting element 4. In this preferred embodiment, the external connecting element 4 may be a pull tape with a winding portion 41. Refer to FIGS. 5 and 8, the fastening element 3 has a combining portion 33 formed on an outer side of the main body 311 of the fastening element 3. The combining portion 33 may be a handle having a securing hole 331. The pull tape (or the external connecting element 4) is combined with the securing hole 331 of the handle (or the combining portion 33) through the winding portion 41, which make the user replace the pull tape.

In summary, the present invention has the following advantages over the prior art. The battery 100 can be detachably snapped onto the casing 600 of the portable electronic device by means of the guiding element 2 and the fastening element 3, so that even if the user forgets to close or secure the door with cover, the battery 100 is still snapped to the casing 600, and thus the battery will be still hard to slip off the portable electronic device or damages due to falling out.

In addition, since the pull tape (or the external connecting element 4) is combined with the handle (or the combining portion 33) of the fastening element 3, users can replace the pull tape on their own to avoid the embarrassing situation of unable to remove the battery 100 from the opposite direction when the pull tape is broken.

While the invention has been described by means of specific embodiments, numerous modifications and variations could be made thereto by those skilled in the art without departing from the scope and spirit of the invention set forth in the claims.

What is claimed is:

1. A portable electronic device having a snap-on battery, comprising: a casing, having an opening portion, a rib formed in the opening portion, and a locking structure disposed at the rib; and a battery, passed through the opening portion and contained in the casing, the battery including a battery body and a fastening element, wherein a guiding element is disposed on a side of the battery body, wherein the fastening element is slidably coupled to and positioned at the guiding element, and wherein the fastening element has a locking structure corresponding to the locking structure of the casing, and the locking structure of the fastening element is entered from the outer side of the locking structure of the casing into the inner side of the locking structure of the casing and engaged to the locking structure of the casing by sliding; wherein the guiding element includes a first blocking body, a second blocking body and a guiding rail coupled between the first blocking body and the second blocking body, wherein the fastening element is slidably coupled to the guiding rail, and wherein the first blocking body and the second blocking body at both ends of the guiding rail respectively block the fastening element; and wherein the fastening element includes a sliding sleeve slidably coupled to the guiding rail and an extending body of the locking structure of the fastening element extended from the sliding sleeve and the sliding sleeve includes a main body and two flanges bent from the main body, wherein a chute is formed between the main body and the two opposite flanges bent from the main body, and a chute is formed between the main body and the two flanges, wherein the fastening element is passed through the chute and slidably coupled to the guiding element, and the two flanges abut two opposite sides of the guiding rail, and wherein one of the two flanges has a snap-on body movably snapped to the guiding rail.

2. The portable electronic device having a snap-on battery as claimed in claim 1, wherein the guiding rail includes a first rail and a second rail having a gap apart from each other, and the first rail has two positioning portions, and the fastening element is selectively snapped on one of the two positioning portions.

3. The portable electronic device having a snap-on battery as claimed in claim 2, wherein the guiding element further includes a base, and the first blocking body, the second blocking body, the first rail and the second rail are formed on an inner side of the base, and a long hole is defined together by the first blocking body, the second blocking body, the first rail and the second rail such that the long hole corresponds to the base.

4. The portable electronic device having a snap-on battery as claimed in claim 1, wherein one of the two flanges has a long hole formed thereon, and the flange having the long hole includes the snap-on body.

5. The portable electronic device having a snap-on battery as claimed in claim 1, wherein the battery further includes an external connecting element, and the fastening element has a combining portion, and the external connecting element is combined with the combining portion.

6. A portable electronic device having a snap-on battery, comprising:
    a casing, having an opening portion, a rib formed in the opening portion, and a locking structure disposed at the rib; and
    a battery, passed through the opening portion and contained in the casing, the battery including a battery body and a fastening element, wherein a guiding element is disposed on a side of the battery body, wherein the fastening element is slidably coupled to and positioned at the guiding element, and wherein the fastening element has a locking structure corresponding to the locking structure of the casing, and the locking structure of the fastening element is entered from the outer side of the locking structure of the casing into the inner side of the locking structure of the casing and engaged to the locking structure of the casing by sliding;
    wherein the battery further includes an external connecting element, wherein the fastening element has a combining portion, and wherein the external connecting element is combined with the combining portion; and
    wherein the combining portion is a handle disposed at the fastening element, and the external connecting element is a pull tape, and the pull tape is fixed to the handle.

7. The portable electronic device having a snap-on battery as claimed in claim 1, wherein the locking structure of the casing comprises a plurality of protrusions and notches, and the locking structure of the fastening element comprises notches corresponding to the protrusions of the locking structure of the casing and protrusions corresponding to the notches of the locking structure of the casing.

8. The portable electronic device having a snap-on battery as claimed in claim 6, wherein the locking structure of the casing comprises a plurality of protrusions and notches, and the locking structure of the fastening element comprises notches corresponding to the protrusions of the locking structure of the casing and protrusions corresponding to the notches of the locking structure of the casing.

* * * * *